United States Patent [19]
Suzuki et al.

[11] Patent Number: 5,510,925
[45] Date of Patent: Apr. 23, 1996

[54] RELAY TRANSMISSION SYSTEM INCLUDING OPTICAL AMPLIFICATION

[75] Inventors: Katsuo Suzuki; Junichi Yoshimura, both of Kawasaki, Japan

[73] Assignee: Fujitsu Limited, Kanagawa, Japan

[21] Appl. No.: 196,966

[22] Filed: Feb. 15, 1994

[30] Foreign Application Priority Data

Sep. 20, 1993 [JP] Japan .................. 5-233762

[51] Int. Cl.$^6$ ................................ H04B 10/02
[52] U.S. Cl. .................. 359/177; 359/174; 359/179
[58] Field of Search .......................... 359/110, 174, 359/177, 179, 178, 166

[56] References Cited

U.S. PATENT DOCUMENTS

| | | | |
|---|---|---|---|
| 4,972,513 | 11/1990 | Mochizuki et al. | 359/127 |
| 4,994,675 | 2/1991 | Levin et al. | 359/110 |
| 5,296,957 | 3/1994 | Takahashi et al. | 359/177 |
| 5,319,488 | 6/1994 | Ishiwatari | 359/179 |
| 5,327,275 | 6/1994 | Yamane et al. | 359/110 |
| 5,337,175 | 8/1994 | Ohnsorge et al. | 359/178 |

FOREIGN PATENT DOCUMENTS

| | | | |
|---|---|---|---|
| 0111582 | 6/1984 | European Pat. Off. | |
| 0531047 | 3/1993 | European Pat. Off. | |
| 1132232 | 5/1989 | Japan . | |
| 3258038 | 11/1991 | Japan | 359/110 |
| 4086131 | 3/1992 | Japan | 359/174 |
| 2207019 | 1/1989 | United Kingdom . | |
| 2229881 | 10/1990 | United Kingdom | 359/110 |
| 2267792 | 12/1993 | United Kingdom . | |
| 2268017 | 12/1993 | United Kingdom . | |

OTHER PUBLICATIONS

I. J. Hirst et al., "Performance Monitoring of Long Chains of Optical Amplifiers", Electronics Letters, vol. 29, No. 3, Feb. 4, 1993.

Y. Sato et al., "OTDR in Optical Transmission Systems Using Er–Doped Fiber Amplifiers Containing Optical Circulators", IEEE Photonics Technology Letters, vol. 3, No. 11, Dec. 1991, pp. 1001–1003.

Jensen et al. "New Technology For Operating and Maintaining SL200—Systems", *S16 Conferences Affichees*, pp. 523–526.

*Primary Examiner*—Leo Boudreau
*Assistant Examiner*—Bhavesh Mehta

[57] ABSTRACT

An optical amplification relay transmission system containing, on a transmission line, an optical repeater for amplifying and relaying an optical signal. The object of the present invention is to perform monitoring of the optical transmission line and optical repeater in a short time and to make the construction of the optical repeater simple. The terminal station contains means for transmitting a burst optical signal on a first optical transmission line, and receiving the burst optical signal transmitted back through a second optical transmission line. Each optical repeater contains a first optical coupler for branching the above burst optical signal transmitted through the first optical transmission line, and a second optical coupler for making the branched burst optical signal, flow through the above second optical transmission line.

13 Claims, 9 Drawing Sheets

FIG. 3a WAVEFORM OF a

FIG. 3b WAVEFORM OF b (NORMAL)

FIG. 3c WAVEFORM OF b (WHEN TROUBLE OCCURS)

WAVEFORM OF c

WAVEFORM OF d

WAVEFORM OF e

WAVEFORM OF f

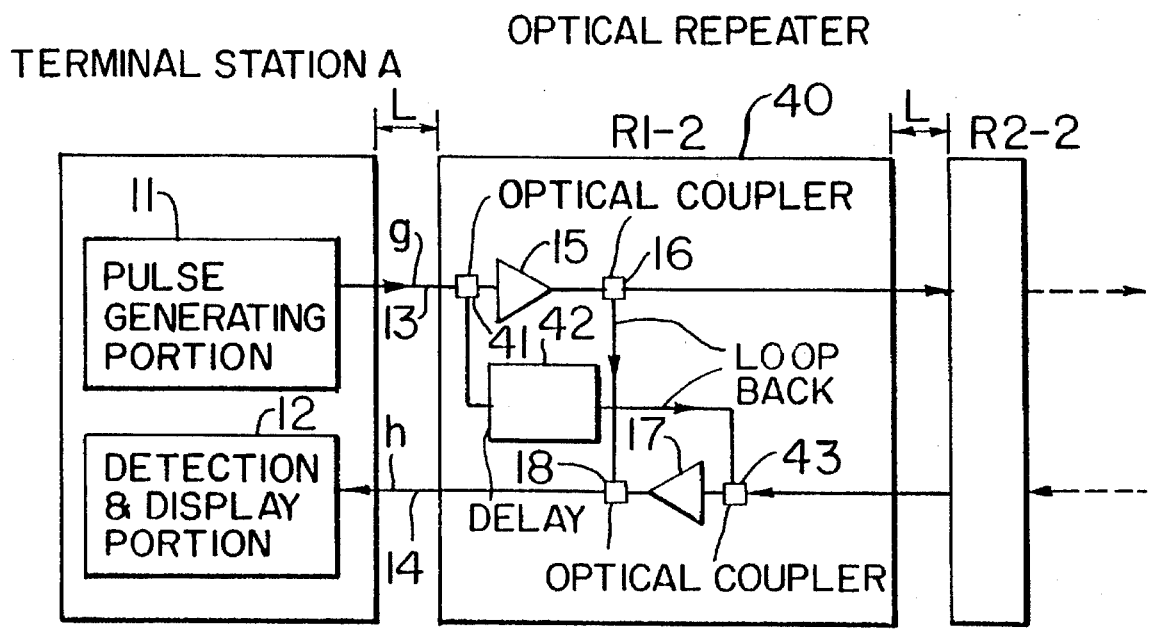
FIG. 6
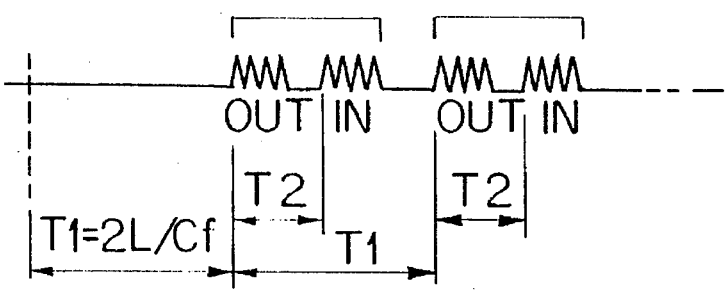
FIG. 7a WAVEFORM OF g
FIG. 7b WAVEFORM OF h

 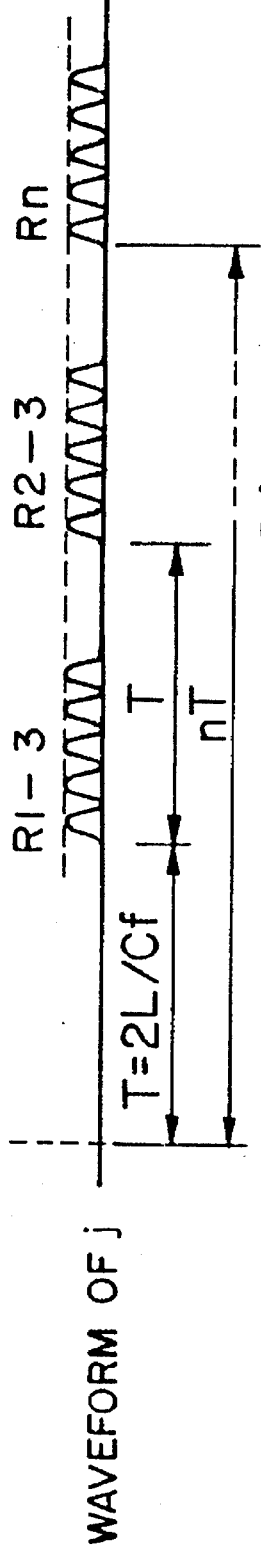 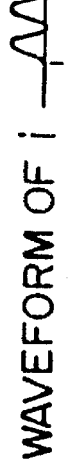 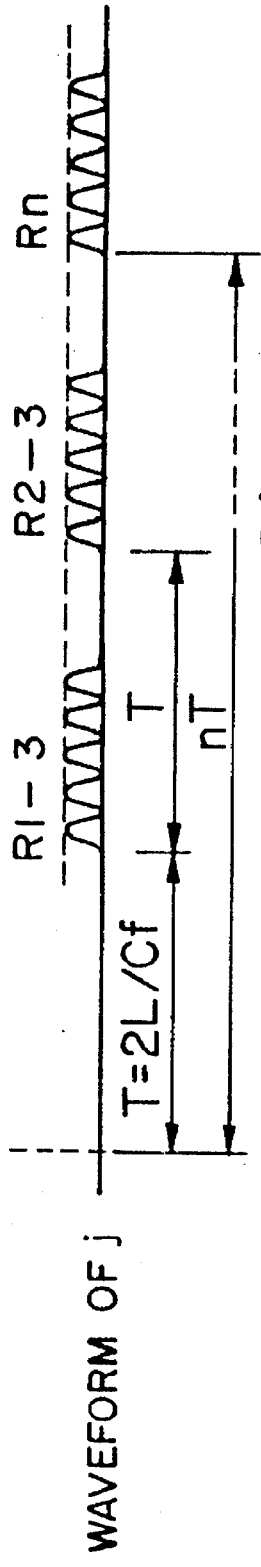 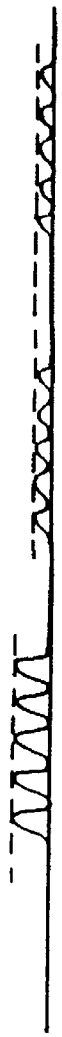 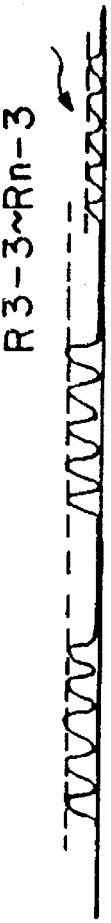 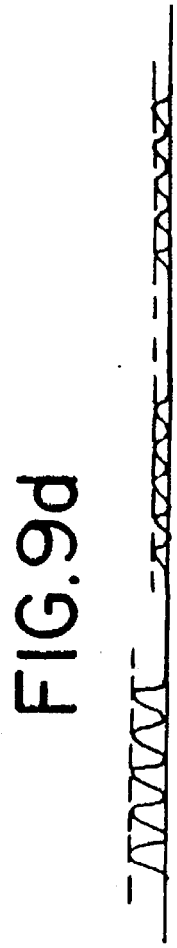
FIG.9a FIG.9b FIG.9c FIG.9d FIG.9e
WAVEFORM OF i
WAVEFORM OF j
WAVEFORM OF j (TROUBLE)
WAVEFORM OF l (FAILURE IN REPEATER UNIT R2-3)
WAVEFORM OF l (FAILURE IN OPTICAL FIBER R1-3~R2-3)
FROM R1-3  FROM R2-3  FROM Rn-3
R1-3  R2-3  Rn
$T = 2L/Cf$  $T$  $nT$
R3-3~Rn-3

RELAY TRANSMISSION SYSTEM INCLUDING OPTICAL AMPLIFICATION

The present invention relates to an optical amplification relay transmission system comprising an optical repeater located on a transmission line, for amplifying and relaying an optical signal. In order to smoothly perform any restoration work needed to overcome system troubles, it is desirable that a terminal station monitors the failure of each optical repeater, any degradation of the amplification characteristics, any break in optical transmission line, and any increase in loss.

BACKGROUND OF THE INVENTION

Monitoring optical transmission lines and optical repeaters in the conventional optical amplification relay transmission line is known. Conventionally, a monitor circuit for monitoring the optical input and output levels and the like, is provided in each optical repeater. In accordance with one approach, a monitor command is sent from the terminal station to each optical repeater through the optical transmission line. When the optical repeater receives the command, the optical repeater returns onto the optical transmission line monitor information to the terminal station such as optical input and output levels. The transmission of signals such as the monitor command and the monitor information, is carried out by amplitude modulation of the main signal. This approach is shown in FIG. 10.

Another approach is disclosed in the unexamined but laid-open Japanese patent publication (Kokai) No. 1-1174339. In that approach an electric signal (burst-like sinusoidal wave) of a predetermined frequency is transmitted from the terminal station through a power feed line provided parallel to the optical transmission line. Each repeater filters an electric signal of the frequency, generates an electric signal of a frequency equal to n times the frequency of the above filtered electric signal, and transmits through the power feed line back to the terminal station. Thus, the electric signal which has the frequency equal to n times that of the original electric signal, and returned from each repeater, is filtered by the terminal station to be displayed on a CRT or the like. The signal returned by each repeater in response to the burst-like electric signal transmitted from the terminal station, is delayed depending on the distance from the terminal station to each relay, which determines when the signal reaches the terminal station. Therefore, the normal operation of the power feed line of the optical cable to each repeater can be monitored on the CRT display by displaying received levels of the returned signals scaled on the ordinate axis, and with the received times scaled on the abscissa axis.

According to the above-mentioned first approach, the control operation for the monitoring is carried out for each optical repeater. Therefore, it takes a long time to complete the monitoring of all of the optical repeaters, and a computer and complex software are necessary for performing the monitoring automatically.

According to the above-mentioned second approach, the normal operation of the optical signal transmission paths including optical fibers and optical repeaters are per se not monitored. However the normal operation of the power feed lines provided parallel to the optical transmission lines in the optical cables, are monitored. Therefore, the normal operation of the optical transmission lines can only be inferred based on the normal operation of the parallel-provided power feed lines. In particular, troubles such as increase in loss in fiber, break of fiber, degradation of characteristics of optical amplification repeaters, and the like, cannot be monitored. Further, electric signals must be modulated in each repeater. Therefore, the circuit constructions of the repeaters become more complex.

Accordingly, an object of the present invention is to provide an optical amplification relay system wherein the optical transmission lines and optical repeaters can be monitored in a short time, and the construction of the optical repeaters is simple.

SUMMARY OF THE INVENTION

According to the invention there is provided an optical amplification transmission system including a terminal station for transmitting and receiving optical signals. A first optical transmission line serves to transmit the optical signals from the terminal station. A second optical transmission line serves as a pair with the first optical transmission line and transmits back optical signals to be received by the terminal station. At least one optical repeater is provided on the pair of first and second optical transmission lines for amplifying the optical signals transmitted through the first and second optical transmission lines. The terminal station includes a burst signal transmitting means for transmitting in a burst mode an optical signal through the first transmission line. It further includes a burst signal receiving means for receiving a burst optical signal transmitted through the second optical transmission line. Each of the optical repeaters include a first optical coupler for branching out the burst signal transmitted through the first optical transmission line and a second optical coupler for making the burst optical signal branched out from the first optical coupler, flow into the second optical transmission line.

The terminal station may comprise a display means for displaying a received level of the burst optical signal received by the burst signal receiving means, where the abscissa axis corresponds to a time axis.

The burst signal transmitting means may repeatedly transmit the burst optical signal, and the burst signal receiving means may comprise average means for obtaining an average value of received levels of the burst optical signal repeatedly transmitted through the at least one optical repeater, in response to the repeated transmissions.

The terminal station may comprise means for generating main signals to be transmitted through the first optical transmission line. The burst signal transmitting means may comprise means for generating the burst optical signal. There is also provided superimpose means for superimposing the burst optical signal onto the above main signal.

The terminal station may also comprise a third optical coupler for branching out the optical signal transmitted through the second optical transmission line, and supplying the same to the burst signal receiving means.

The burst optical signal may contain a predetermined frequency component corresponding to the terminal station. The burst signal receiver means 3 may comprise extracting means for extracting the predetermined frequency component corresponding to the terminal station, from the optical signal received through the second optical transmission line.

Each of the at least one optical repeater may comprise attenuation means for attenuating the burst optical signals branched out by the first optical couplers.

Each of the at least one optical repeater may comprise, first amplification means for amplifying the optical signals transmitted through the first optical transmission line, and second amplification means for amplifying the optical signals transmitted through the second optical transmission line. The first optical couplers may be located on the output side of the first amplification means on the first optical transmission line, and the second optical coupler may be located on an output side of the second amplification means on the second optical transmission line.

Each of the at least one optical repeater may comprise a third optical coupler, located on the input side of the first amplification means on the first optical transmission line, for branching out the burst optical signal transmitted through the first optical transmission line; delay means for delaying by a predetermined delay (T2) the burst optical signal branched out by the third optical coupler; and fourth optical coupler, located on an input side of the second amplification means, for making the burst optical signal delayed by the delay means, flow into the second optical transmission line.

In the construction mentioned above, the first optical coupler may be provided on the input side of the first amplification means on the first optical transmission line; and the second optical coupler may be provided on the input side of the second amplification means on the second optical transmission line.

In the construction mentioned above, the third optical coupler may be provided on the output side of the first amplification means; and the fourth optical coupler may be provided on the output side of the second amplification means.

In the case wherein the terminal station contains a plurality of pairs of the optical transmission lines each transmitting and receiving optical signals the burst optical signal after being looped back according to the present invention may then be returned to the terminal station through an optical transmission line in a pair of optical transmission lines which pair is different from the pair through which the burst optical signal was previously looped back. This is only as long as these different pairs are provided in parallel from the terminal station. The construction for this case will be explained later in detail as a fourth embodiment.

BRIEF DESCRIPTION OF THE DRAWINGS

In the drawings:

FIG. 6 is a diagram illustrating the construction of a third embodiment of the present invention.

FIG. 7(a) and 7(b) are diagrams useful in explaining the operation of the construction of FIG. 6.

FIGS. 9(a) through 9(e) are graphs useful in explaining the operation of the construction of FIG. 8

DETAILED DESCRIPTION OF THE INVENTION

Figure 1:
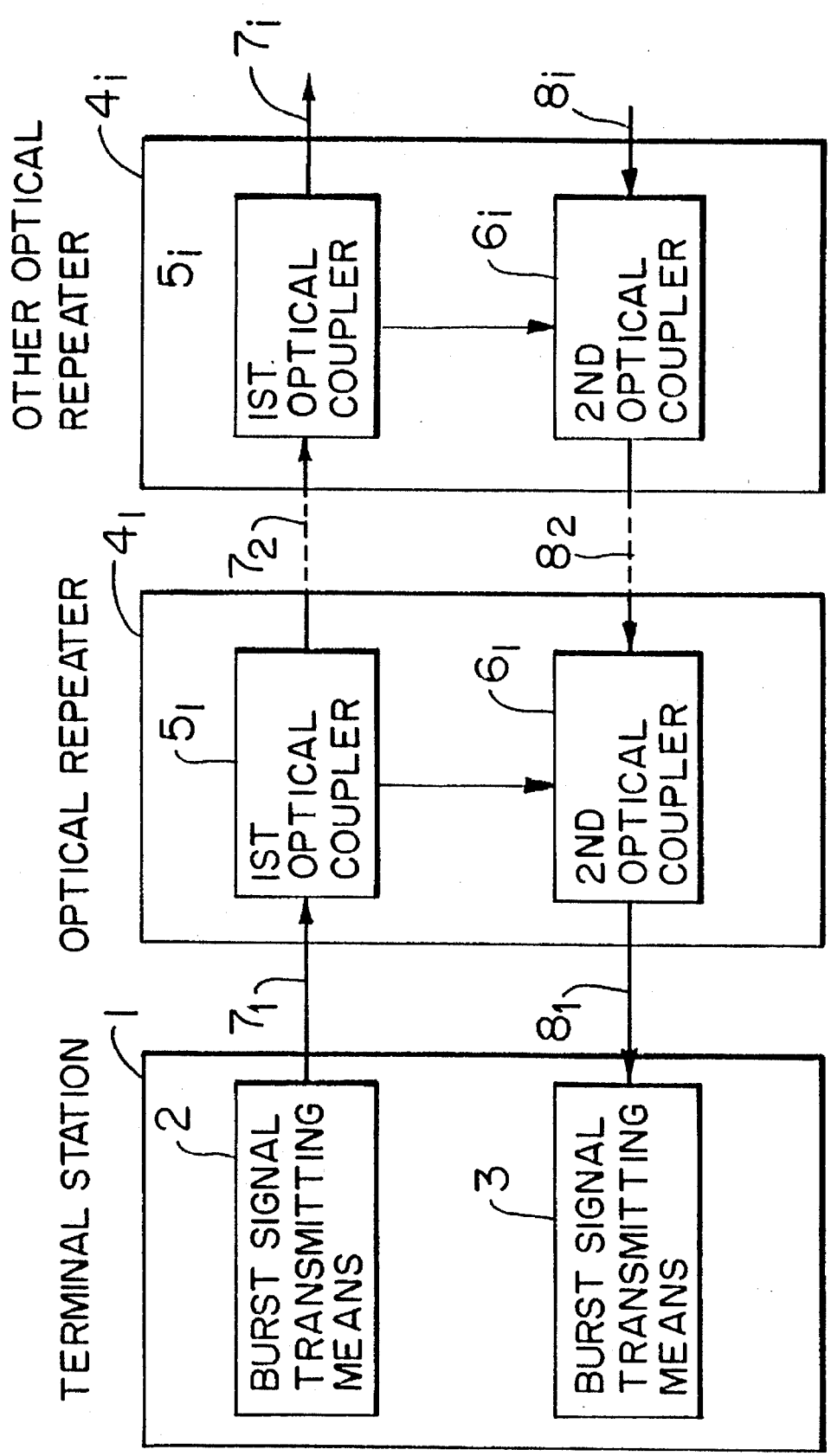
FIG. 1 is a block diagram illustrating the basic construction of the present invention.

FIG. 1 is a diagram illustrating the basic construction of the optical amplification transmission system according to the present invention. In FIG. 1, reference numeral 1 denotes a terminal station, $4_1, \ldots 4_i \ldots$ each denote an optical repeater, $7_1, \ldots 7_i \ldots$ each denote a section of a first optical transmission line, and $8_1, \ldots 8_i \ldots$ each denote a section of a second optical transmission line. In the terminal station 1, reference numeral 2 denotes a burst signal transmitting means, and 3 denotes a burst signal receiving means. In addition, in each of the optical repeaters $4_1, \ldots 4_i \ldots, 5_1, \ldots 5_i \ldots$ each denote a first optical coupler, and $6_1, \ldots 6_i \ldots$ each denote a second optical coupler.

The terminal station 1 transmits and receives optical signals. The first optical transmission line $7_1, \ldots 7_i \ldots$ transmits an optical signal transmitted from the terminal station 1.

The second optical transmission line $8_1, \ldots 8_i \ldots$ is provided so as to form a pair with the first optical transmission line $7_1, \ldots 7_i \ldots,$ in order to transmit back an optical signal to be received by the terminal station 1.

At least one optical repeater $4_1, \ldots 4_i \ldots$ is provided on the pair of the first and second optical transmission lines $7_1, \ldots 7_i \ldots, 8_1, \ldots 8_i \ldots$ to amplify the optical signals transmitted through the first and second optical transmission lines $7_1, \ldots 7_i \ldots, 8_1, \ldots 8_i \ldots$ In the terminal station 1, the burst signal transmitting means 2 transmits a burst optical signal on the first optical transmission line $7_1, \ldots 7_i \ldots$ The burst signal receiving means 3 receives the burst optical signal transmitted through the second optical transmission line $8_1, \ldots 8_i \ldots$ In each of the at least one optical repeater $4_1, \ldots 4_i \ldots$, the first optical coupler $5_1, \ldots 5_i \ldots$ branches out the above burst optical signal transmitted through the first optical transmission line.

The second optical coupler $6_1, \ldots 6_i \ldots$ makes the burst optical signal branched out by the first optical coupler $5_1, \ldots 5_i \ldots$, flow into the second optical transmission line.

According to the construction of FIG. 1, while the burst optical signal transmitted from the burst signal transmitting means 2 in the terminal station 1, is transmitted through the optical transmission line $7_1, \ldots 7_i \ldots,$ in each of the optical repeaters $4_1, \ldots 4_i \ldots,$ a portion of the burst optical signal is branched out by the first optical couplers $5_1, \ldots 5_i \ldots,$ to be supplied to the second optical couplers $6_1, \ldots 6_i \ldots$ in the same optical repeater. The second optical couplers $6_1, \ldots 6_i \ldots$ makes the burst optical signal which is branched out to it, flow into the optical transmission line $8_1, \ldots 8_i \ldots$ Thus, in each of the optical repeaters $4_1, \ldots 4_i \ldots,$ a portion of the burst optical signal transmitted from the terminal station 1 through the optical transmission line $7_1, \ldots 7_i$ is looped back, so as to be transmitted through the optical transmission line $8_1, \ldots 8_i \ldots$ and back to the terminal station 1. The time needed for the burst optical signal to be transmitted through the optical transmission lines $7_1, \ldots 7_i \ldots$ and $8_1, \ldots 8_i \ldots,$ depends on the distance of the transmission line. Therefore, the timing at which the burst optical signal looped back from each of the optical repeaters $4_1, \ldots 4_i \ldots,$ until it reaches the terminal station 1, is different depending on the distance from the terminal station 1 to each of the optical repeaters $4_1, \ldots 4_i \ldots$ Thus the burst signal receiving means 3 can confirm the normal operation or abnormal operation of the transmission line from the terminal station 1 to each optical repeater, and the normal operation or abnormal operation of the transmission line from each optical repeater back to the terminal station 1, by monitoring the received levels of the burst optical signal.

According to the present invention, the terminal station merely comprises means for transmitting the burst optical signal, and means for monitoring the burst optical signal looped back. What is necessary to be provided in each optical repeater, is a route to loop back by branching a portion of the optical signal transmitted through the optical transmission line. Therefore, the construction of the repeater becomes very simple. Further, what is necessary to be performed, is to transmit at least once a burst optical signal from the terminal station, and to monitor the level of the burst optical signal when it reaches back to the terminal station after being looped back. Therefore, the time needed for confirming the normal operation of the optical transmission line including the optical repeaters, is minimized.

Figure 2:
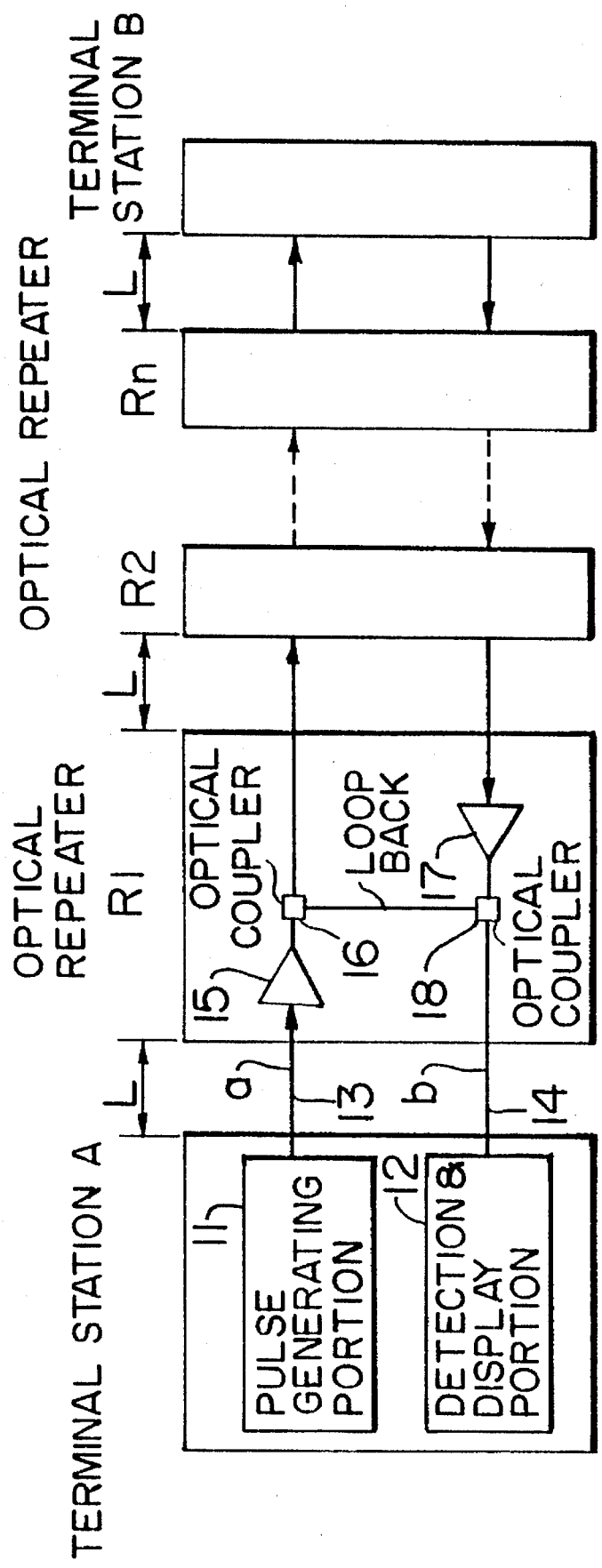
FIG. 2 is a block diagram illustrating the construction of a first embodiment of the present invention.

FIG. 2 is a block diagram illustrating the construction of a first embodiment of the present invention. In FIG. 2, the terminal station A and terminal station B are connected with going and returning optical transmission lines 13 and 14, and optical repeaters R1, R2 . . . Rn are provided on the going and returning optical transmission lines 13 and 14 at spaced intervals L. The terminal station A comprises the pulse generating portion 11 and the detection and display portion 12. Each optical repeater Ri (i=1 to n) comprises the optical amplification portions 15 and 17 respectively provided on the going and returning optical transmission lines, and further comprises, according to the present invention, optical couplers 16 and 18 on the output sides of the optical amplification portions 15 and 17 on the optical transmission lines. The optical amplification portions 15 and 17 carry out the main function of the optical repeater, and each directly amplifies optical signals by using, for example, the well-known erbium-doped fiber and the like.

The optical coupler 16 branches out a portion of the optical signal at the output of the optical amplification portion 15 to supply the same to the optical coupler 18. The optical coupler 18 makes the branched optical signal couple to the output of the optical amplification portion 17.

In addition, in the construction of FIG. 2, the terminal station B has the same construction as the terminal station A, the optical couplers 16 and 18 in each optical repeater Ri may be of a two-way type. In this case, in addition to the above function, the optical coupler 18 branches out a portion of the optical signal as the output of the optical amplification portion 17 to supply the same to the optical coupler 16. The optical coupler 16, in addition to the first function described above also makes the branched optical signal from coupler 18 to couple to the output of the optical amplification portion 15.

Although, in the construction of FIG. 2, the optical couplers 16 and 18 are respectively provided on the output sides of the optical amplification portions 15 and 17, the optical couplers 16 and 18 may also be respectively provided on the input sides of the optical amplification portions 15 and 17.

Figure 3:
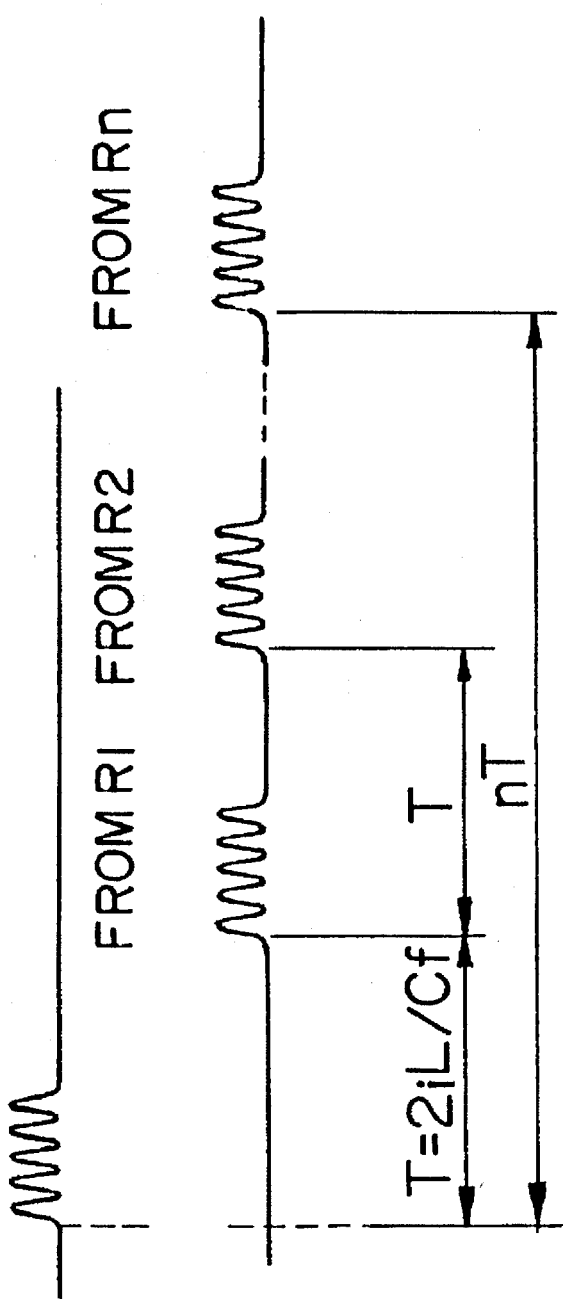
FIGS. 3(a), 3(b) and 3(c) are graphs useful in explaining the operation of the construction of FIG. 2.

FIG. 3 is an explanatory diagram of the operation of the construction shown in FIG. 2.

When a burst optical signal (as indicated in FIG. 3a) is transmitted from the pulse generating portion 11 of the terminal station A on the optical transmission line 13, the signal is looped back by each of the optical repeaters R1, R2 . . . Rn, and reaches the detection and display portion 12 of the terminal station A from each optical repeater, after a delay time equal to T=2 iL/Cf, where i=1 to n, and Cf is a propagation velocity of optical signals on the optical transmission line. In the case wherein the optical transmission lines (including the optical repeaters) going to and returning from each of the optical repeaters R1, R2 . . . Rn are operating normally, the level of the burst optical signal looped back by each of the optical repeaters R1, R2 . . . Rn is normal, as indicated in FIG. 3b. For example, in the case wherein the optical transmission lines (including the optical repeater) going to and returning from the optical repeater R1 are normal, and the optical transmission lines (including the optical repeaters) going to and returning from the optical repeaters R2 are not normal, the level of the burst optical signal looped back by the optical repeater R1 is normal, but the levels of the burst optical signals looped back by the optical repeaters R2 . . . Rn are not normal, as indicated in FIG. 3c. Thus, whether or not the optical transmission lines (including the optical repeaters) going to and returning from each of the optical repeaters R1, R2 . . . Rn are normal, can be recognized at the detection and display portion 12 in the terminal station A.

Figure 4:
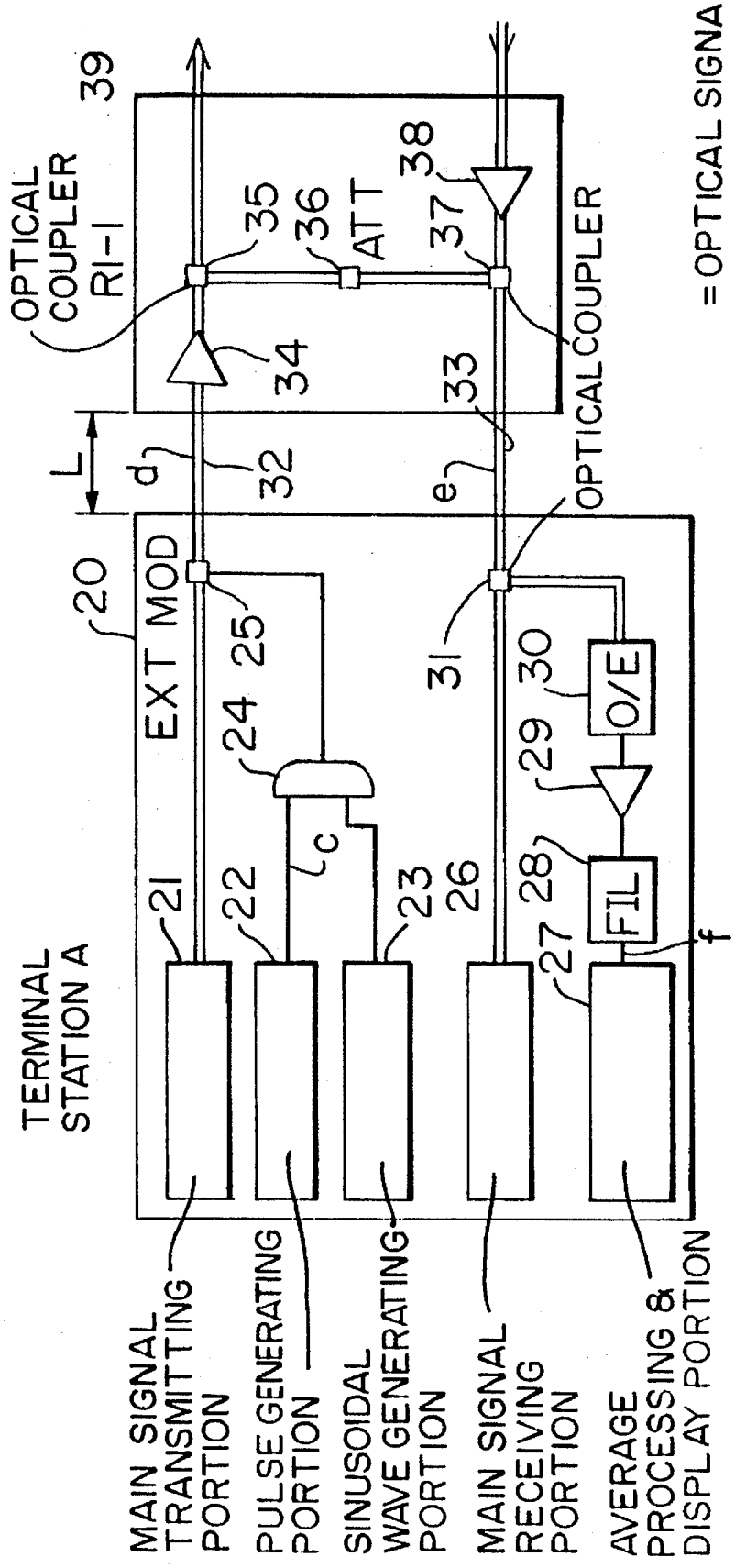
FIG. 4 is a block diagram illustrating the construction of a second embodiment of the present invention.

FIG. 4 is a diagram illustrating the construction of a second embodiment of the present invention. Although, in FIG. 4, the terminal station A and the optical repeater 39 which is nearest to the terminal station are shown, actually, a plurality of optical repeaters each having the same construction as the optical repeater indicated in FIG. 4, may be provided as was indicated in FIG. 2. In FIG. 4, reference numeral 21 denotes a main signal transmitting portion, 22 denotes a pulse generating portion, 23 denotes a sinusoidal wave generating portion, 24 denotes a gate circuit, 25 denotes an external modulator (optical coupler), 26 denotes a main signal receiving portion, 27 denotes an average processing and display portion, 28 denotes a filter circuit, 29 denotes an amplifier, 30 denotes a photoelectric conversion circuit, 31 denotes an optical coupler, 32 and 33 each denote an optical transmission lines, 34 and 38 each denotes an optical amplification portion, 35 and 37 each denotes an optical coupler, and 36 denotes an attenuator.

According to the construction of FIG. 4, the test monitor of the optical transmission lines regarding their normal operation can be performed even during the transmission of the main signals.

Figure 5A:
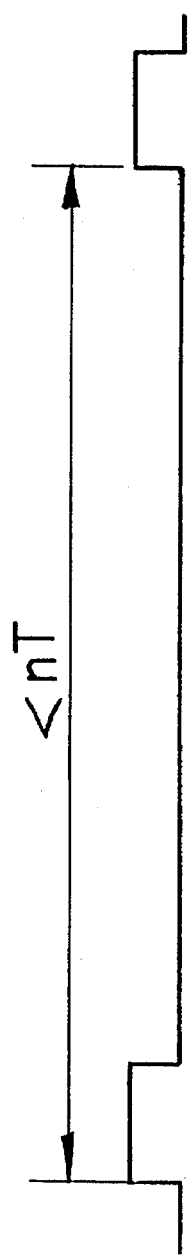
FIGS. 5(a), 5(b), 5(c) and 5(d) are graphs useful in explaining the operation of the construction of FIG. 4.
Figure 5B:
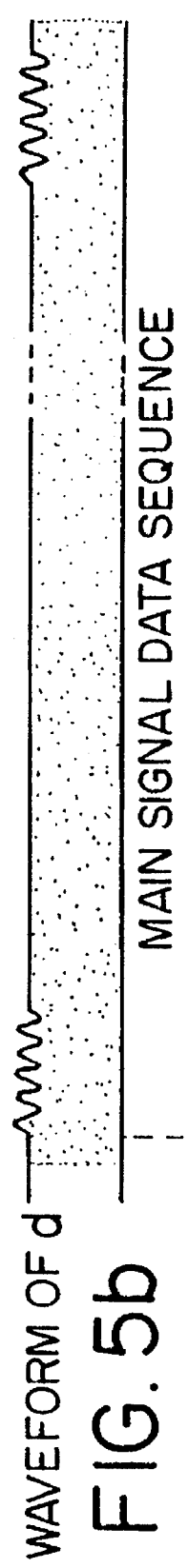

The sinusoidal wave generating portion 23 in the terminal station 20 generates a sinusoidal wave pulse for the purpose of monitoring. The fundamental frequency of the sinusoidal wave pulse is, for example, 1MHz. The pulse generating portion 22 generates a gate pulse indicating a time duration in which the burst optical signal is allowed to be superimposed on the main signal as shown in FIG. 5a. This gate pulse is output with intervals which are sufficiently longer than nT which is a time it takes for a signal to be looped back by the furthest optical repeater and come back to the terminal station 20. The sinusoidal wave pulse and the gate pulse are supplied to the gate circuit 24, and the sinusoidal wave pulse is supplied to the external modulator 25 as a modulation signal only when the gate pulse is active. In the external modulator 25, as indicated in FIG. 5b, the sinusoidal wave pulse supplied is superimposed on the main signal transmitted by the main signal transmitting portion 21, where the degree of the modulation is determined so that the error characteristic of the main signal is not affected. Namely, the amplitude of the sinusoidal wave pulse to be superimposed is made small so that the discrimination of the main signal is not affected.

Figure 5C:
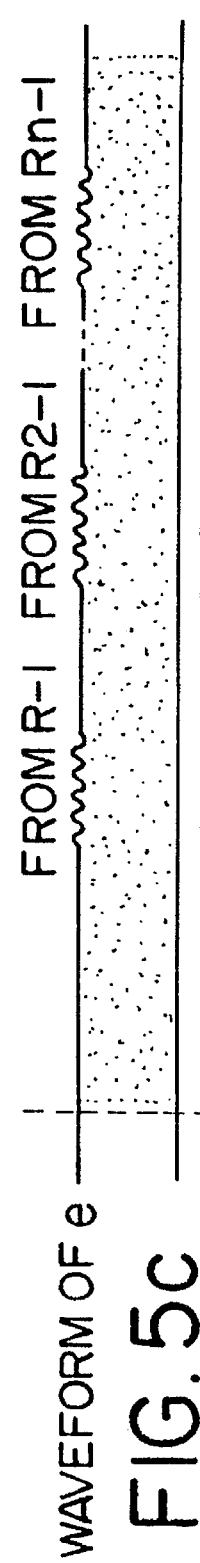

Although, in each of the optical repeaters Ri-1 (i=1 to n), the optical couplers 35 and 37 have the same functions as the optical couplers 16 and 17 in each optical repeater in the construction of FIG. 2, the attenuator 36 is provided on the loop-back path of the optical signal from the optical coupler 35 to the optical coupler 37 in the construction of FIG. 4 in order to set the loop-back loss (ATT) so that the degree of the modulation in the optical coupler 37 does not affect the error characteristic of the main signal. FIG. 5c indicates an example of a waveform of an optical signal which is generated by superimposing the sinusoidal wave pulse signal on the main signal by the optical coupler 37.

The repeater interval L is, for example, about 50 kilometers. In this case, the time interval T between sinusoidal wave pulse signals looped back by adjacent optical repeaters and returned to the terminal station, is about 1 millisecond, and the fundamental wave of the sinusoidal wave pulse may be a low frequency such as 1 MHz. Thus, it is easy to realize a highly-sensitive optical receiving system for the monitor signal.

Figure 5D:
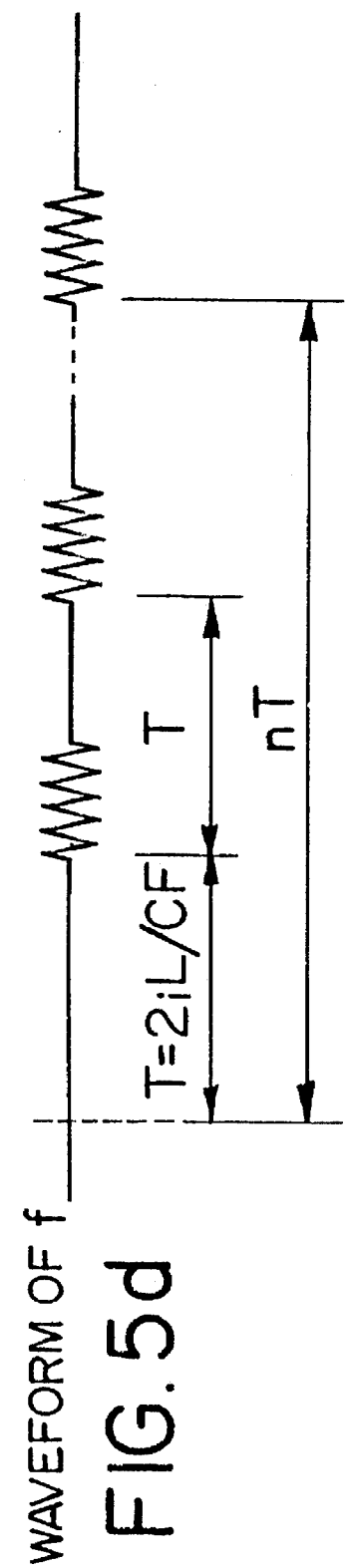

On the receiver side of the terminal station, the optical signal in which the sinusoidal wave pulse signal is superimposed on the main signal, is branched by the optical coupler 31 to the main signal receive portion 26 and to the photo-electric conversion circuit 30. The main signal is processed by the main signal receiving portion 26. The photo-electric conversion circuit 30 converts the branch optical signal into the electric signal, and the electric signal is supplied through the amplifier 29 to the filter circuit 28. The filter circuit 28 is provided to discriminate the sinusoidal wave pulse transmitted to its own station A, from another sinusoidal wave pulse transmitted from an opposite terminal station, which is not shown in FIG. 4, in the case wherein the terminal station opposite to the terminal station A transmits the above other sinusoidal wave pulse toward the terminal station A on the optical transmission line 33 for monitoring the optical transmission lines. When the frequencies of the sinusoidal wave pulses transmitted from the opposite terminal stations are different, the above measurement can be carried out simultaneously at both terminal stations between which the communication system is constructed, since each terminal station selectively receives the sinusoidal wave pulse transmitted from its own station and looped back through the filter circuit provided on the receiver side. FIG. 5d indicates an example of a waveform of the output of the filter circuit 28 in FIG. 4.

In the case where the terminal station repeatedly transmits the sinusoidal wave pulse signal with intervals which are longer than the above nT, and the average processing and display portion 27 provided on the receiving side obtains an average of received levels of looped-back sinusoidal wave pulses from each optical repeater, the preciseness of the measurement can be further improved. In the display portion 27, the result of the measurement can be displayed by setting, for example, the abscissa as a time axis, and the ordinate as an axis of the received level.

FIG. 6 is a diagram illustrating the construction of a third embodiment of the present invention. Although, in FIG. 6, the construction containing the terminal station A and the optical repeater 40 which is nearest the terminal station is indicated, actually, a plurality of optical repeaters, each of which has the same construction as the optical repeater R1-2 indicated in FIG. 6, can be provided in FIG. 6, as was indicated in FIG. 2. In the optical repeater of FIG. 6, reference numerals 41 and 43 each denote an optical coupler, and 42 denotes a delay circuit. The other construction of the optical repeater and the construction of the terminal station A are the same as the construction as shown in FIG. 2.

In each optical repeater in the construction of FIG. 6, a loop-back path including the optical amplification portion 15 on the side of the optical transmission line 13, and a loop-back path including the optical amplification portion 17 on the side of the optical transmission line 14, are realized, and the delay circuit 42 is provided in the loopback path including the optical amplification portion 17 on the side of the optical transmission line 14, so that the sinusoidal wave pulses looped back by the two loop-back paths do not overlap each other. As can be understood from FIG. 7, the delay time in the delay circuit 42 must be smaller than the time difference between the times in which sinusoidal wave pulses looped back by adjacent optical repeaters reach the terminal station, and must be longer than the duration of an individual sinusoidal wave pulse.

FIG. 7b indicates the timing of the optical signals which are looped back, for example, by the optical repeaters R1-2 and R2-2, and returned through the optical transmission line 14 to the terminal station A, in the construction of FIG. 6, when a pulse as indicated in FIG. 7a is transmitted from the pulse generating portion 11 in the terminal station A onto the optical transmission line 13. Thus, according to the construction of FIG. 6, normal operation of the optical amplification portion located in each direction of each optical repeater can be confirmed simultaneously.

Figure 8:
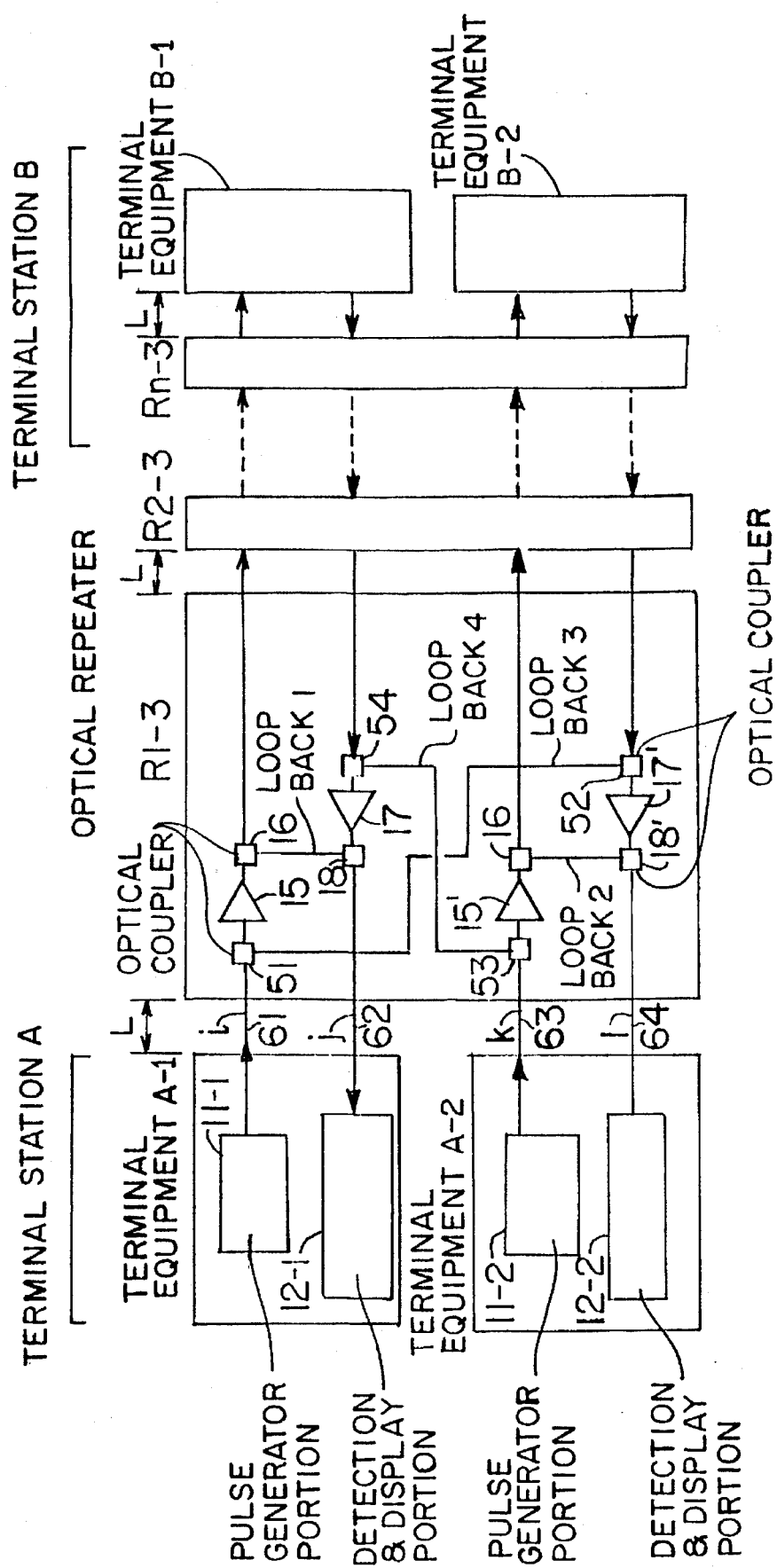
FIG. 8 is a diagram illustrating the construction of a fourth embodiment of the present invention.
Figure 10:
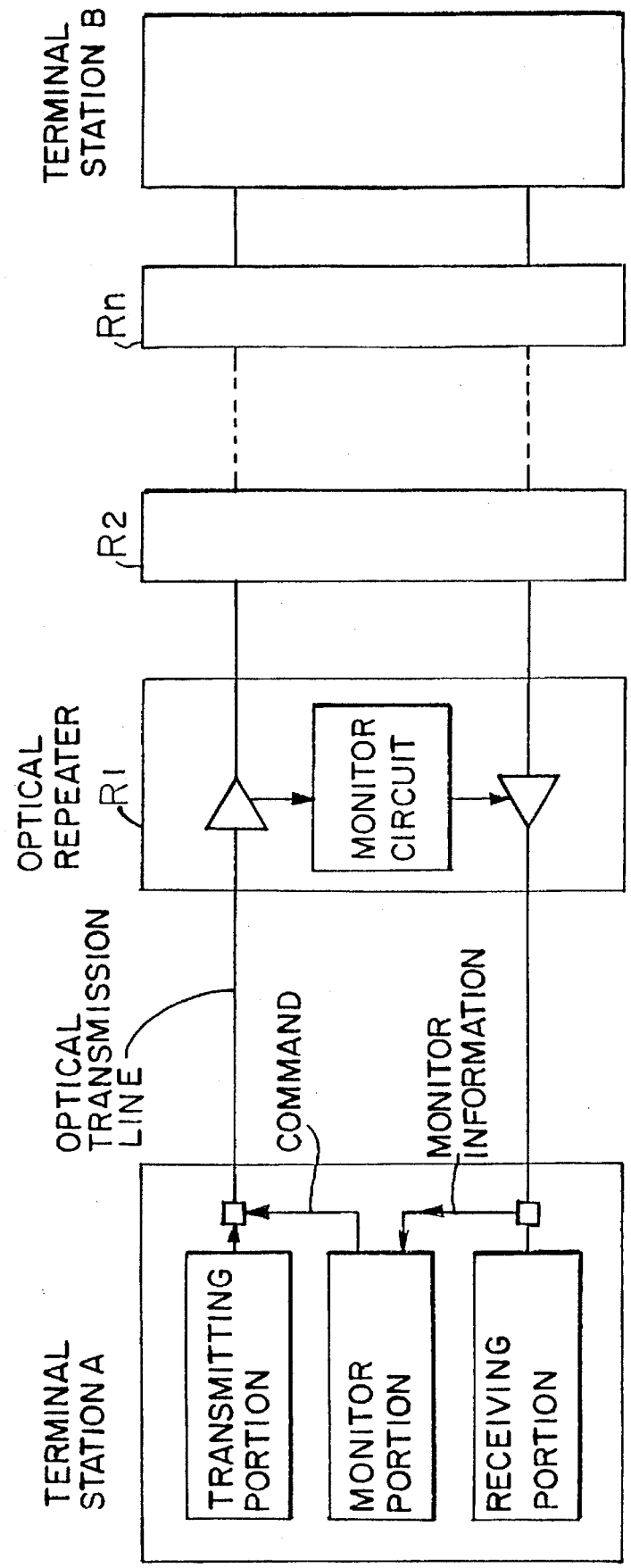
FIG. 10 is a diagram illustrating the prior art and showing a first approach for monitoring optical transmission lines and optical repeaters in the conventional optical amplification relay transmission line.

FIG. 8 is a diagram illustrating the construction of a fourth embodiment of the present invention. In the construction of FIG. 8, the terminal station A and terminal station B are connected by a plurality of pairs of optical transmission lines shown in FIG. 8. In each terminal station, a piece of terminal equipment is provided corresponding to each pair of optical transmission lines. The pieces of terminal equipment A-1 and A-2 are provided in the terminal station A, and the pieces of terminal equipment B-1 and B-2 are provided in the terminal station B. Each piece of terminal equipment contains a pulse generating portion (11-1, 11-2) and a detection and display portion (12-1, 12-2), as was shown in the terminal station A in FIG. 2. Between the terminal station A and the terminal station B, the optical repeaters are provided commonly to the plurality of pairs of optical transmission lines. In each of the optical repeaters, the same construction is provided as in the optical repeater of FIG. 2 for each pair of optical transmission lines. Namely, a pair of optical amplifier portions in the two directions, and a pair of optical couplers, are provided for each pair of optical transmission lines. In the construction of FIG. 8, in addition to the construction for the loop back in each pair of optical transmission lines in each optical repeater, as was indicated in FIG. 2, loop-back paths each including the optical amplification portion are provided over a different pair of optical transmission lines. Such last mentioned loop-back paths were not included in the loop-back path in FIG. 2. The sinusoidal wave pulse transmitted from the pulse generating portion 11-1 in the terminal equipment A-1 onto the optical transmission line 61 for monitoring, is branched out by the optical coupler 51 provided on the input side of the optical amplification portion 15 (loop-back 3), in addition to the loop-back path (loop back 1) which is the same as the loop-back path of FIG. 2. The above branched optical signal is coupled to optical signals transmitted in the optical transmission line 64 in the direction returning to the terminal station A of the different pair of optical transmission lines, through the optical coupler 52 provided on the input side of the optical amplification portion 17. This optical signal (sinusoidal wave pulse) is detected by the detection and display portion 12-2 in the terminal equipment A-2 (loop back 3). Similarly, the sinusoidal wave pulse transmitted from the pulse generating portion 11-2 in the terminal equipment A-2 onto the optical transmission line 63 for monitoring, is branched out by the optical coupler 53 provided on the input side of the optical amplification portion 15 (loop-back 4), in addition to the loop-back path (loop back 2) which is the same as the loop-back path of FIG. 2. The above branched optical signal (loop-back 4) is coupled to optical signals transmitted in the optical transmission line 62 (in the direction returning to the terminal station A) in the different pair of optical transmission lines, by the optical coupler 54 provided on the input side of the optical amplification portion 17. Then, the optical signal (sinusoidal wave pulse) is detected by the detection and display portion 12-1 in the terminal equipment A-1 (loop back 4).

FIG. 9b indicates the received levels of the sinusoidal wave pulse which comes back from each repeater to the detection and display portion 12-1 in the terminal equipment A-1 through the loop back 1 in the case wherein no abnormality occurs in the loop-back path when the sinusoidal wave pulse as indicated in FIG. 9a is transmitted from the pulse generating portion 11-1 in the terminal station A-1 in the construction of FIG. 8. In the case where an abnormality occurs on the loop-back path which comes back from the optical repeater R2-3 to the detection and display portion 12-1 in the terminal equipment A-1 through the loop back 1, the detection and display portion 12-1 in the terminal station A-1 can detect the abnormality from the received levels of the sinusoidal wave pulses which come back from the optical repeater R2-3 and optical repeaters located farther than the optical repeater R2-3, as indicated in FIG. 9c.

In the case wherein the detection and display portion 12-1 in the terminal station A-1 detects the result as indicated in FIG. 9c, and at the same time, the detection display portion 12-2 in the terminal station A-2 detects the result as indicated in FIG. 9d, when the sinusoidal wave pulse as indicated in FIG. 9a is transmitted from the pulse generating portion 11-1 in the terminal station A-1; it is then considered that the abnormality occurs in the optical amplification portion 15 on the optical transmission line 61 in the outgoing direction in the optical repeater R2-3. This is because the abnormality in the received levels is detected as indicated in FIG. 9c for the path of the loop back 1 including the optical amplification portion 15 on the optical transmission line 61 in the outgoing direction in the optical repeater R2-3, and normal conditions in the received level is detected as indicated in FIG. 9d for the path of the loop back 3 not including the optical amplification portion 15 on the optical transmission line 61 in the outgoing direction in the optical repeater R2-3.

In the case wherein the detection display portion 12-1 in the terminal station A-1 detects the result as indicated in FIG. 9c, and at the same time, the detection display portion 12-2 in the terminal station A-2 detects the result as indicated in FIG. 9e, when the sinusoidal wave pulse as indicated in FIG. 9a is transmitted from the pulse generating portion 11-1 in the terminal station A-1; it is then considered that the abnormality occurs on the optical transmission line 61 between the optical repeaters R1-3 and R2-3. This is because the abnormality in the received levels is detected, as indicated in FIG. 9c and 9e, for both the path of the loop back 1 including the optical amplification portion 15 on the optical transmission line 61 in the outgoing direction in the optical repeater R2-3, and the path of the loop back 3 not including the optical amplification portion 15 on the optical transmission line 61 in the outgoing direction in the optical repeater R2-3. Therefore, the abnormality is not caused by the optical amplification portion 15.

As explained above, according to the construction of FIG. 8, abnormality in the optical amplification portion in the optical repeater, and trouble on the optical transmission line between optical repeaters, can be distinguishably monitored.

Further, a delay circuit as indicated in FIG. 6 can be provided in each of the loop-back paths 3 and 4 in the construction of FIG. 8. The detection and display portions 12-1 and 12-2 in the terminal stations A-1 and A-2 can then discriminate sinusoidal wave pulses simultaneously transmitted from the terminal stations A-1 and A-2.

We claim:

1. An optical amplification transmission system comprising:

a terminal station for transmitting and receiving optical signals;

a first optical transmission line for transmitting the optical signals transmitted from the terminal station;

a second optical transmission line forming a pair with the first optical transmission line for transmitting optical signals to be received by the terminal station;

at least one optical repeater, provided on the pair of said first and second optical transmission lines for amplifying the optical signals transmitted through the respective first and second optical transmission lines;

said terminal station comprising:
   burst signal transmitting means for transmitting in a burst mode a burst optical signal through the first optical transmission line, said burst optical signal being repeatedly transmitted and
   burst signal receiving means for receiving the burst optical signal transmitted back through the second optical transmission line, said burst signal receiving means including average means for obtaining an average value of received levels of the burst optical signals, repeatedly transmitted through the at least one optical repeater, in response to the repeated transmission;

each optical repeater comprising:
   a first optical coupler for branching out the burst optical signal transmitted through the first optical transmission line, and
   a second optical coupler for receiving the burst optical signal branched out by the first optical coupler, and sending it onto the second optical transmission line.

2. An optical amplification transmission system as in claim 1, wherein the terminal station further comprises a display means for displaying a received level of the burst optical signal received by the burst signal receiving means, wherein an abscissa of the display means corresponds to a time axis.

3. An optical amplification transmission system as in claim 1, wherein the terminal station further comprises means for generating a main signal to be transmitted through the first optical transmission line;

said burst signal transmitting means comprises,
   means for generating the burst optical signal, and
   superimpose means for superimposing the burst optical signal on the above main signal.

4. An optical amplification transmission system as in claim 1, wherein said terminal station comprises a third optical coupler for branching out the optical signal transmitted through the second optical transmission line, and supplying the same to the burst signal receiving means.

5. An optical amplification transmission system as in claim 1, wherein the burst optical signal contains a predetermined frequency component representing the terminal station; and said burst signal receiving means comprises extracting means for extracting said predetermined frequency component from the burst optical signal received through the second optical transmission line.

6. An optical amplification transmission system as in claim 5 and further comprising another terminal station located at opposite ends of the transmission lines from said terminal station, and wherein the predetermined frequency component in said terminal station is different from the predetermined frequency component in said another terminal station, said terminal station communicating with said another terminal station.

7. An optical amplification transmission system as in claim 1, wherein each optical repeater further comprises attenuation means for attenuating the burst optical signal branched out by the first optical coupler.

8. An optical amplification transmission system as in claim 1, wherein each optical repeater further comprises, first amplification means for amplifying the optical signal transmitted through the first optical transmission line, and second amplification means for amplifying the optical signal transmitted through the second optical transmission line;

the first optical coupler being located on an output side of said first amplification means on the first optical transmission line, and the second optical coupler being located on an output side of said second amplification means on the second optical transmission line.

9. An optical amplification transmission system as in claim 8, wherein each optical repeater further comprises, a third optical coupler located on an input side of the above first amplification means on said first optical transmission line, for branching out the burst optical signal transmitted through the first optical transmission line, delay means for delaying by a predetermined delay (T2) the burst optical signal branched out by the third optical coupler, and a fourth optical coupler, located on an input side of the second amplification means, for receiving the delayed burst optical signal and sending into the second optical transmission line.

10. An optical amplification transmission system as in claim 1, wherein each optical repeater comprises, first amplification means for amplifying the optical signal transmitted through the said first optical transmission line, and second amplification means for amplifying the optical signal transmitted through the said second optical transmission line;

said first optical coupler being provided on the input side of the said first amplification means on the said first optical transmission line; and the said second optical coupler being provided on the input side of the said second amplification means on the said second optical transmission line.

11. An optical amplification transmission system as in claim 10, wherein each optical repeater further comprises, a third optical coupler, provided on the output side of said first amplification means on said first optical transmission line, for branching out the burst optical signal transmitted through said first optical transmission line;

delay means for delaying by a predetermined delay (T2) the burst optical signal branched out by said third optical coupler;

a fourth optical coupler, provided on the output side of said second amplification means, for receiving the delayed burst optical signal and sending it into said second optical transmission line.

12. An optical amplification transmission system comprising:

a terminal station for transmitting and receiving and a plurality of optical signals;

a first optical transmission line for transmitting a first optical signal transmitted from the terminal station;

a second optical transmission line forming a pair with the first optical transmission line for transmitting a second optical signal, corresponding to the first optical signal, to be received by the terminal station;

a third optical transmission line, provided in parallel to the above first and second optical transmission lines, for transmitting a third optical signal transmitted from the terminal station;

A fourth optical transmission line forming a pair with the third optical transmission line for transmitting a fourth optical signal, corresponding to the third optical signal, to be received by the terminal station;

at least one optical repeater, provided on the first to fourth optical transmission lines for amplifying the first to fourth optical signals transmitted on the first to fourth optical transmission lines;

said terminal station comprising,
a first burst signal transmitting means for transmitting a first burst optical signal on the first optical transmission line,
a first burst signal receiving means for receiving the first burst optical signal transmitted back through the second optical transmission line,
a second burst signal transmitting means for transmitting a second burst optical signal on the above third optical transmission line, and
a second burst signal receiving means for receiving the second burst optical signal transmitted back through the fourth optical transmission line;

each of said at least one optical repeater comprising,
a first amplification means for amplifying the first optical signal transmitted through the first optical transmission line,
a second amplification means for amplifying the second optical signal transmitted through the second optical transmission line,
a third amplification means for amplifying the optical signal transmitted through the third optical transmission line,
a fourth amplification means for amplifying the optical signal transmitted through the fourth optical transmission line,
a first optical coupler provided on the output side of the first amplification means on the first optical transmission line, for branching out the first burst optical signal transmitted through the first optical transmission line,
a second optical coupler provided on the output side of the second amplification means on the second optical transmission line, for receiving first burst optical signal branched out by the first optical coupler and sending it into the second optical transmission line,
a third optical coupler provided on the output side of the third amplification means on the third optical transmission line, for branching out the second burst optical signal transmitted through the third optical transmission line, a fourth optical coupler provided on the output side of the fourth amplification means on the fourth optical transmission line, for receiving the second burst optical signal branched out by the third optical coupler and sending it into the fourth optical transmission line, a fifth optical coupler provided on the input side of the first amplification means on the first optical transmission line, for branching out the first burst optical signal transmitted through the first optical transmission line, a sixth optical coupler provided on the input side of the fourth amplification means on the fourth optical transmission line, for receiving the first burst optical signal branched out by the fifth optical coupler and sending it into the fourth optical transmission line, a seventh optical coupler provided on the input side of the third amplification means on the third optical transmission line, for branching out the second burst optical signal transmitted through the third optical transmission line, and an eighth optical coupler provided on the input side of the second amplification means on the second optical transmission line, for receiving the second burst optical signal branched out by the seventh optical coupler and sending it into the above second optical transmission line.

13. An optical amplification transmission system comprising:

a terminal station for transmitting and receiving a plurality of optical signals;

a first optical transmission line for transmitting a first optical signal transmitted from the terminal station;

a second optical transmission line forming a pair with the first optical transmission line, for transmitting a second optical signal, corresponding to the first optical signal, to be received by the terminal station;

a third optical transmission line, provided in parallel to the first and second optical transmission lines, for transmitting a third optical signal transmitted from the terminal station;

a fourth optical transmission line forming a pair with the third optical transmission line, for transmitting a fourth optical signal, corresponding to the third optical signal, to be received by the terminal station;

at least one optical repeater provided on the first to fourth optical transmission lines for amplifying the first to fourth optical signals transmitted on the first to fourth optical transmission lines;

the said terminal station comprising, a first burst signal transmitting means for transmitting a first burst optical signal on the first optical transmission line, a first burst signal receiving means for receiving the first burst optical signal transmitted through the second optical transmission line, a second burst signal transmitting means for transmitting a second burst optical signal on the third optical transmission line, and a second burst signal receiving means for receiving the second burst optical signal transmitted through the fourth optical transmission line;

each of said at least one optical repeater comprising, a first amplification means for amplifying the optical signal transmitted through the first optical transmission line, a second amplification means for amplifying the optical signal transmitted through the second optical transmission line, a third amplification means for amplifying the optical signal transmitted through the third optical transmission line, a fourth amplification means for amplifying the optical signal transmitted through the fourth optical transmission line, a first optical coupler, provided on the input side of the first amplification means on the first optical transmission line, for branching out the first burst optical signal transmitted through the first optical transmission line, a second optical coupler, provided on the input side of the second amplification means on the second optical transmission line, for receiving the first burst optical signal branched out by the first optical coupler and sending it into the second optical transmission line, a third optical coupler, provided on the input side of the third amplification means on the third optical transmission line, for branching out the second burst optical signal transmitted through the third optical transmission line, a fourth optical coupler, provided on the input side of the fourth amplification means on the fourth optical transmission line, for receiving the second burst optical signal branched out by the third optical coupler and sending it into the fourth optical transmission line, a fifth optical coupler, provided on the output side of the first amplification means on the first optical transmission line, for branching out the first burst optical signal transmitted through the first optical transmission line, a sixth optical coupler, provided on the output side of the fourth amplification means on the fourth optical transmission line, for receiving the first burst optical signal branched out by the fifth optical coupler and sending it into the fourth optical transmission line, a seventh optical coupler, provided on the output side of the third amplification means on the third optical transmission line, for branching out the second burst optical signal transmitted through the third optical transmission line, and an eighth optical coupler, provided on the output side of the second amplification means on the second optical transmission line, for receiving the second burst optical signal branched out by the seventh optical coupler and sending it into the second optical transmission line.

* * * * *